(No Model.)

P. KRUMSCHEID.
PNEUMATIC BICYCLE TIRE.

No. 524,280. Patented Aug. 7, 1894.

WITNESSES
Frank G. Parker
Edward S. Day

INVENTOR
Peter Krumscheid

UNITED STATES PATENT OFFICE.

PETER KRUMSCHEID, OF BOSTON, MASSACHUSETTS, ASSIGNOR OF ONE-HALF TO PHILIP J. DUGGAN, OF SAME PLACE.

PNEUMATIC BICYCLE-TIRE.

SPECIFICATION forming part of Letters Patent No. 524,280, dated August 7, 1894.

Application filed December 26, 1893. Serial No. 494,771. (No model.)

*To all whom it may concern:*

Be it known that I, PETER KRUMSCHEID, of Boston, in the county of Suffolk and State of Massachusetts, have invented a new and useful Improvement in Pneumatic Bicycle-Tires, of which the following, taken in connection with the accompanying drawings, is a specification.

My invention relates to a device for securing the envelope of a pneumatic bicycle tire to the rim of the wheel, the object being to so construct the rim of the wheel, and the edges of the envelope, that the envelope can be easily attached to or removed from the wheel. This object I accomplish by means of the mechanism shown in the accompanying drawings, in which—

Figure 1:
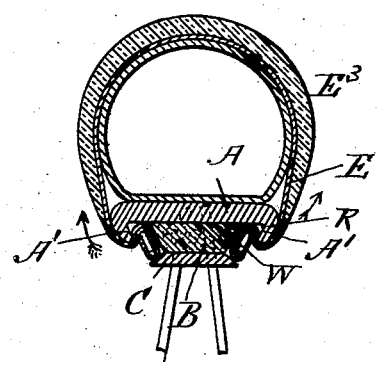
Figure 2:
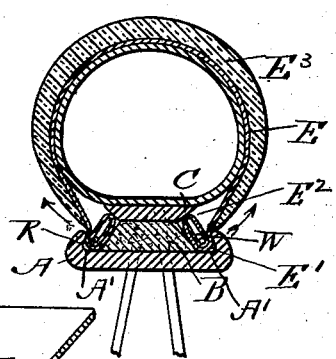
Figure 3:
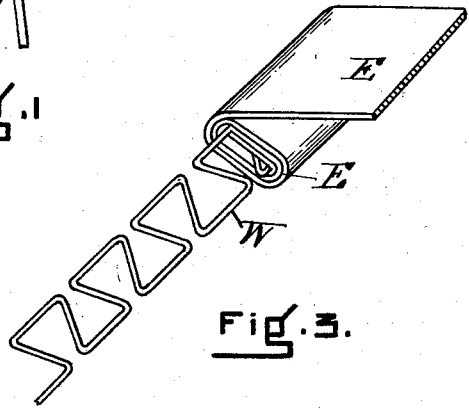
Figure 4:
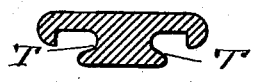
Figure 5:

Figure 1 shows in cross section a rim of a bicycle wheel and a pneumatic tire. Fig. 2 shows the same parts that are shown in Fig. 1, but the parts that compose the rim are in reverse position. Fig. 3 is a perspective view showing the method of forming the thickened edges of the envelope. Figs. 4 and 5 show modifications in the construction of the rim of the wheel.

In the drawings, A represents in cross-section the main part of the rim; this may be made of wood or metal, as deemed desirable. B is a second member of the rim, made substantially in the form shown, and is preferably of some light material like cork. The third member, C, of the rim is formed of any suitable material and substantially in the form shown.

The recesses at A' A' formed by the edges of the members A, B, C, are shaped substantially as shown, that is, with one undercut side as shown at R R, Figs. 1 and 2, and at T T, Figs. 4 and 5.

The reinforced edges E' of the envelope E are made as illustrated in perspective in Fig. 3, the core W being a wire bent as shown, the object of thus bending the wire is to obtain a core that is longitudinally elastic, and bendable laterally, and yet rigid and non-yielding from edge to edge in its own plane. The fabric of which the envelope is made is wound about the core W and cemented.

When the edge of the envelope is placed in one of the recesses as shown in Figs. 1 and 2, it cannot be pulled out by any strain exerted in the line of the arrows, but can be readily removed by being so manipulated as to cause the edge $E^2$ to slide out from the projecting side of the member C.

The principle of action of my thickened edge is that, it being a long oval in cross section, it cannot be drawn out of its recess except it is turned on its axis in a direction opposite to that which is caused by any strain that will be exerted by the envelope, but if in the other direction it will come out without trouble.

The envelope can be coated with any desirable material $E^3$ in the usual manner. The central member B may be of a single piece or made up of a number of layers.

I claim—

In a bicycle tire, the combination of an envelope, the edges of which are formed of thin flexible material, wound over and over a wire core, said wire core being formed of wire bent as described so as to form a tape like strip, the edges of which constitute a straight, continuous, and rigid support for the over wound thin fabric; with a rim having recesses as described, substantially as and for the purpose set forth.

In testimony whereof I have signed my name to this specification, in the presence of two subscribing witnesses, on this 23d day of December, A. D. 1893.

PETER KRUMSCHEID.

Witnesses:
FRANK G. PARKER,
WILLIAM EDSON.